United States Patent
Spapis et al.

(10) Patent No.: US 12,369,085 B2
(45) Date of Patent: Jul. 22, 2025

(54) ENHANCED SERVICE CONTINUITY UTILIZING MUSIM

(71) Applicant: NOKIA TECHNOLOGIES OY, Espoo (FI)

(72) Inventors: Panagiotis Spapis, Munich (DE); Prajwal Keshavamurthy, Munich (DE); Laura Luque Sanchez, Nibe (DK); Srinivasan Selvaganapathy, Bangalore (IN); Faranaz Sabouri-Sichani, Aalborg (DK); Amaanat Ali, Espoo (FI)

(73) Assignee: Nokia Technologies Oy, Espoo (FI)

(*) Notice: Subject to any disclaimer, the term of this patent is extended or adjusted under 35 U.S.C. 154(b) by 360 days.

(21) Appl. No.: 18/249,053

(22) PCT Filed: Oct. 8, 2021

(86) PCT No.: PCT/EP2021/077880
§ 371 (c)(1),
(2) Date: Apr. 13, 2023

(87) PCT Pub. No.: WO2022/078902
PCT Pub. Date: Apr. 21, 2022

(65) Prior Publication Data
US 2023/0397071 A1  Dec. 7, 2023

(30) Foreign Application Priority Data
Oct. 15, 2020 (IN) .............................. 202041044952

(51) Int. Cl.
*H04W 88/06* (2009.01)
*H04W 36/00* (2009.01)
(Continued)

(52) U.S. Cl.
CPC ... *H04W 36/0085* (2018.08); *H04W 36/1443* (2023.05); *H04W 36/322* (2023.05); *H04W 36/362* (2023.05); *H04W 88/06* (2013.01)

(58) Field of Classification Search
CPC ......... H04W 36/0085; H04W 36/1443; H04W 36/322; H04W 36/362; H04W 88/06
See application file for complete search history.

(56) References Cited

U.S. PATENT DOCUMENTS

2014/0044099 A1   2/2014  Sfar
2015/0312717 A1  10/2015  Shih et al.
(Continued)

FOREIGN PATENT DOCUMENTS

EP     3516907 A       7/2019
JP     2010093639 A    4/2010
(Continued)

OTHER PUBLICATIONS

Office Action received for corresponding Indian Patent Application No. 202347032969, dated Aug. 9, 2024, 5 pages.
(Continued)

*Primary Examiner* — Julio R Perez
(74) *Attorney, Agent, or Firm* — Robert P. Michal, Esq.; Carter, DeLuca & Farrell LLP

(57) ABSTRACT

Apparatus and method to perform receiving from a network node of a first mobile network of more than one mobile network of a communication network, by a user equipment of the first mobile network, an indication (610) of an approaching coverage limit for a coverage area associated with a link between the first public land mobile network and the user equipment wherein the user equipment includes a multi subscriber identity module, and wherein a first subscriber identity module of the multi subscriber module is
(Continued)

connected to a network node associated with the first mobile network; and based on the receiving, performing pro-active preparation for causing (620) a second subscriber identity module of the multi subscriber identity module of the user equipment to enable pro-active preparation of switching to a second mobile network of the more than one mobile network in response to an upcoming failure of the link between the user equipment and the first mobile network based on the approaching coverage limit of the coverage area. Further, there is determining, by a network node of a first mobile network of more than one mobile network of a communication network, an approaching coverage limit for a coverage area associated with a link between the first mobile network and a user equipment, wherein the user equipment includes a multi subscriber identity module and wherein a first subscriber identity module of the multi subscriber module is connected to a network node associated with the first public land mobile network; and based on determining, sending towards the user equipment information including an indication to perform pro-active preparation for causing a second subscriber identity module of the multi subscriber identity module of the user equipment to enable pro-active preparation for switching by the second subscriber identity module to a second mobile network of the more than one mobile network in response to an upcoming failure of the link between the user equipment and the first mobile network based on the approaching coverage limit of the coverage area.

20 Claims, 7 Drawing Sheets

(51) Int. Cl.
*H04W 36/14* (2009.01)
*H04W 36/32* (2009.01)
*H04W 36/36* (2009.01)

(56) References Cited

U.S. PATENT DOCUMENTS

| | | |
|---|---|---|
| 2016/0057570 A1 | 2/2016 | Lin et al. |
| 2016/0087831 A1 | 3/2016 | Shah et al. |
| 2016/0262200 A1 | 9/2016 | Su |
| 2017/0055201 A1 | 2/2017 | Murray et al. |
| 2017/0171902 A1 | 6/2017 | Tillman et al. |
| 2018/0098262 A1 | 4/2018 | Chakraborty |

FOREIGN PATENT DOCUMENTS

| | | |
|---|---|---|
| JP | 2017532873 A | 11/2017 |
| WO | 2017/166278 A1 | 10/2017 |
| WO | 2018/065049 A1 | 4/2018 |

OTHER PUBLICATIONS

"Apple, Details of Conditional Handover", 3GPP TSG-RAN WG2 Meeting #106, R2-1907177, Agenda Item: 12.3.3.2, May 13-17, 2019, 3 pages.

Office Action received for corresponding Japanese Patent Application No. 2023-523062, dated Oct. 8, 2024, 4 pages of Office Action and no page of translation available.

International Search Report and Written Opinion for International Application No. PCT/EP2021/077880, mailed on Jan. 27, 2022, 21 pages.

3GPP TSG-RAN WG2 Meeting #106, R2-1907177 (Resubmission of R2-1903614); "Details of Conditional Handover"; Agenda Item: 12.3.3.2; Source: Apple; Reno, Nevada, USA; May 13-17, 2019, 3 pages.

"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.

"Revised SID: Study on system enablers for multi-SIM devices", TSG SA Meeting #SP-83, SP-190248, Agenda Item: 17B.19, SA WG2, Mar. 20-22, 2019, 4 pages.

"3rd Generation Partnership Project; Technical Specification Group Services and System Aspects; Study on Support for Multi-USIM Devices (Release 17)", 3GPP TR 22.834, V17.2.0, Dec. 2019, pp. 1-17.

"3rd Generation Partnership Project; Technical Specification Group Services and System Aspects; Study on system enablers for devices having multiple Universal Subscriber Identity Modules (USIM) (Release 17)", 3GPP TR 23.761, V0.4.0, Jun. 2020, pp. 1-78.

"New WID: Support for Multi-SIM devices in Rel-17", 3GPP TSG RAN Meeting #86, RP-193263, Agenda Item: 9.1.2, vivo, Dec. 9-12, 2019, 5 pages.

"3rd Generation Partnership Project; Technical Specification Group Services and System Aspects; Study on enhancement of 3GPP Support for 5G V2X Services (Release 16)", 3GPP TR 22.886, V16.2.0, Dec. 2018, pp. 1-76.

"3rd Generation Partnership Project; Technical Specification Group Services and System Aspects; Procedures for the 5G System (5GS); Stage 2 (Release 16)", 3GPP TS 23.502, V16.5.0, Jul. 2020, pp. 1-594.

Monhof et al., "Cellular Network Coverage Analysis and Optimization in Challenging Smart Grid Environments", IEEE International Conference on Communications, Control, and Computing Technologies for Smart Grids (SmartGridComm), Oct. 29-31, 2018, 6 pages.

"Keeping vehicles connected when they cross borders", Ericsson, Retrieved on May 16, 2024, Webpage available at : https://www.ericsson.com/en/blog/2019/5/connected-vehicle-cross-border-service-coverage.

Msc-Generator, Sourceforge, Retrieved on May 16, 2024, Webpage available at : https://sourceforge.net/projects/msc-generator/.

Chakraborty et al., "Automated cost reduction while using multiple SIMs in a single mobile device", 4th International Conference on Networking, Systems and Security (NSysS), Dec. 18-20, 2017, 6 pages.

Office Action received for corresponding Japanese Patent Application No. 2023-523062, dated Apr. 9, 2024, 9 pages of Office Action and 5 pages of English translation available, total 14 pages.

| RRC RELEASE REQ. | | |
|---|---|---|
| CAUSE FOR SERVING PLMN/USIM CHANGE | | |
| LOCATION 1 (LONGITUDE, LATITUDE) | RSRP, RSRQ, CQI, SINR FOR THE SERVING CELL | ... |
| LOCATION 2 (LONGITUDE, LATITUDE) | RSRP, RSRQ, CQI, SINR FOR THE SERVING CELL | |
| LOCATION 3 (LONGITUDE, LATITUDE) | RSRP, RSRQ, CQI, SINR FOR THE SERVING CELL | |
| ... | | |

FIG.5

ENHANCED SERVICE CONTINUITY UTILIZING MUSIM

CROSS-REFERENCE TO RELATED APPLICATIONS

This application is a national stage entry of International Application No. PCT/EP2021/077880, filed Oct. 8, 2021, entitled "ENHANCED SERVICE CONTINUITY UTILIZING MUSIM" which claims the benefit of priority of Indian application Ser. No. 20204,1044952, filed Oct. 15, 2020, both of which are hereby incorporated by reference in their entireties.

TECHNICAL FIELD

The teachings in accordance with the exemplary embodiments of this invention relate generally to enhanced Service Continuity operations and, more specifically, relate to enhanced Service Continuity operations utilizing a Multi Universal Subscriber Identity Module.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
  3GPP: 3rd Generation Partnership Project
  AMF: Access and Mobility Management Function
  DSDA: Dual SIM Dual Active
  DSDS: Dual SIM Dual Standby
  eSIM: Electronic Subscriber Identity Module
  HPLMN: Home PLMN
  IMSI: International Mobile Subscriber Identity
  LTE: Long Term Evolution
  MUMA: Multi USIM Multi Active
  MUMS: Multi USIM Multi Standby
  MUSIM: Multi Universal Subscriber Identity Module
  NR: New Radio
  PLMN: Public Land Mobile Network
  RAN: Radio Access Network
  RAT: Radio Access Technology
  RLF Radio Link Failure
  RLM Radio Link Monitoring
  RRC: Radio Resource Control
  RRM: Radio Resource Management
  SEP Standard Essential Patents
  SIM: Subscriber Identity Module
  SUPI: Subscription Permanent Identifier
  UC: Centralized Unit
  UE: User Equipment
  USIM: Universal Subscriber Identity Module Wireless communications systems are widely deployed to provide various types of communication capabilities for devices including user equipment and other network devices using multiple-access systems of a network to communicate with one another. Examples of such multiple-access systems include 4G systems such as Long Term Evolution (LTE) type systems, and 5G systems which may be referred to as New Radio (NR) systems. A wireless multiple-access communications system may include a number of base stations or network access nodes to support these communication devices and systems.

In certain cases, the communication devices such as UE can include more than one Universal Subscriber Identity Module (USIM) or a Multi Universal Subscriber Identity Module (MUSIM) where a USIM provides various functions for performing operations for authentication and access to network devices such as these base stations and/or network access nodes. These operations include identification and authentication of the user's subscription, security key generations, etc. for the access.

Two main types of MUSIM devices are normally referred to depending on the supported simultaneous RRC_states on the USIMs:
  Dual SIM Dual Standby (DSDS) or Multi USIM Multi Standby (MUMS): MUSIM devices which are registered with two or more independent subscriber IDs (USIMs) and can be in RRC_IDLE mode on all USIMs. However, it can ONLY be on RRC_CONNECTED mode with a single USIM at a given time; and
  Dual SIM Dual Active (DSDA) or Multi USIM Multi Active (MUMA): MUSIM devices which are registered with two or more independent subscriber IDs (USIMs) and can be in RRC_IDLE mode on all USIMs. And the device can maintain RRC_CONNECTED mode activities on all USIMs.

Furthermore, the UE's behaviour with respect to the simultaneous handling of multiple USIMs may depend on the UE's capabilities as listed below:
  SingleRx/SingleTx: The UE is only capable of receiving traffic from one network and and/or transmitting traffic to one network at a time (type 1);
  DualRx/SingleTx: The UE is capable of simultaneously receiving traffic from two networks but is capable of transmitting to only one network at a time (type 2); and
  DualRx/DualTx: The UE is capable of simultaneously receiving and/or transmitting to/from two networks (type 3).

Further, when a UE experiences network outage, it will follow one of the two options:
  1) Lose the connection, and it will start scanning the spectrum to identify potential alternative networks to serve the UE. Once such alternative(s) is identified, it will initiate the registration procedure to the new network(s). This procedure is sequential and takes some seconds for each attempt which is performed—for the identified networks. The overall registration process, in case of roaming, varies based on the UE configuration from the Home PLNM (HPLMN), since the latter can configure the sequence of the UE registration attempts based on roaming agreements, as well as error handling timers; or
  2) Perform inter-operator handover. Current standardization solutions support inter-operator HO, require deployment of N14 interface between the operator, which needs agreements among them since it exposes their network topology.

As described above regarding Service Continuity the V2X UEs when accessing a service may experience service interruption, for example at cross-border, because they reach a temporary network outage, in case inter-operator handover is not supported.

Example embodiments of the invention as disclosed herein work to at least address these issues and improve related operations associated with use of multiple USIM of a network device such as a User Equipment by a network node such as a base station.

SUMMARY

In an example aspect of the invention, there is an apparatus, such as a user equipment side apparatus, comprising: at least one processor; and at least one memory including computer program code, where the at least one memory and the computer program code are configured, with the at least one processor, to cause the apparatus to at least: receive by a user equipment from a network node of a communication network, an indication of an approaching coverage limit for a coverage area associated with a link between a first mobile network and the user equipment, wherein the user equipment comprises a multi subscriber identity module, and wherein a first subscriber identity module of the multi subscriber module is connected to a network node associated with the first mobile network; and based on the receiving, performing pro-active preparation for causing a second subscriber identity module of the multi subscriber identity module of the user equipment to enable pro-active preparation of switching to a second mobile network of the more than one mobile network in response to an upcoming failure of the link between the user equipment and the first mobile network based on the approaching coverage limit of the coverage area.

In another example aspect of the invention, there is a method, comprising: receiving from a network node of a communication network, by a user equipment of the first public land mobile network, an indication of an approaching coverage limit for a coverage area associated with a link between a first mobile network of more than one mobile network of the communication network and the user equipment wherein the user equipment comprises a multi subscriber identity module, and wherein a first subscriber identity module of the multi subscriber module is connected to a network node associated with the first mobile network; and based on the receiving, performing pro-active preparation for causing a second subscriber identity module of the multi subscriber identity module of the user equipment to enable pro-active preparation of switching to a second mobile network of the more than one mobile network in response to an upcoming failure of the link between the user equipment and the first mobile network based on the approaching coverage limit of the coverage area.

A further example embodiment is a method and apparatus comprising the method and apparatus of the previous paragraphs, wherein the preparation is based on an indication from the network node that the user equipment is moving out of the coverage area, wherein the pro-active preparation comprises performing early measurements based on information associated with radio conditions of the communication network, wherein the information is associated with outage knowledge of a database of cells collected by the network node, wherein the information comprises an indication of at least one condition to be met before establishing a further connection to another mobile network of the more than one mobile network, wherein the at least one condition is based on at least one of an expiration of a timer, an exact location of the user equipment, or radio resource management measurements, wherein the information comprises assistance information on a suitable more than one mobile network for the further connection, and wherein the assistance information comprises an identification of another mobile network of the more than one mobile network, wherein the assistance information is directing the user equipment to switch to the another mobile network based on inter-operator agreements of the communication network, wherein the performing pro-active preparation is based on radio conditions of a cell in the first mobile network of the more than one mobile network that the first subscriber identity module is connected to approaching a coverage limit of the coverage area, wherein the user equipment is connected to the first mobile network, wherein the second subscriber identity module of the user equipment is caused to perform pro-active preparation for switching to another mobile network of the more than one mobile network the user equipment is also subscribed to, wherein the first subscriber identity module is registered in the first mobile network of the communication network and the second subscriber identity module is one of camped on a mobile network or is in a roaming mode, wherein the pro-active preparation comprises identifying with the first subscriber identity module that switching to another mobile network associated with the first subscriber identity module is not preferred based on radio conditions, wherein there is based on the identifying, causing the second subscriber identity module of the multi subscriber identity module to identify whether a different mobile network of the more than one mobile network of the communication network associated with the second subscriber identity module is suitable to switch to in response to determining service continuity of at least one application at the user equipment, wherein the determining is based on at least one of knowledge of outages, network node malfunction, network management information, or a country change, wherein the indication to perform pro-active preparation is based on at least one of abstract location knowledge or exact location knowledge by the network node, wherein the indication is based on at least one of radio resource management or radio link monitoring measurements, and wherein there is communicating by the user equipment a request message and report associated with a switch by the second subscriber identity module of the user equipment based on the pro-active preparation.

A non-transitory computer-readable medium storing program code, the program code executed by at least one processor to perform at least the method as described in the paragraphs above.

In another example aspect of the invention, there is an apparatus comprising: means for receiving from a network node of a first mobile network of more than one public land mobile network of a communication network, by a user equipment of the first mobile network, an indication of an approaching coverage limit for a coverage area associated with a link between the first mobile network and the user equipment wherein the user equipment comprises a multi subscriber identity module, and wherein a first subscriber identity module of the multi subscriber module is connected to a network node associated with the first mobile network; and based on the receiving, performing pro-active preparation for causing a second subscriber identity module of the multi subscriber identity module of the user equipment to enable pro-active preparation of switching to a second mobile network of the more than one public land mobile network in response to an upcoming failure of the link between the user equipment and the first mobile network based on the approaching coverage limit of the coverage area.

In accordance with the example embodiments as described in the paragraph above, at least the means for receiving and performing comprises a network interface, and computer program code stored on a computer-readable medium and executed by at least one processor.

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node of a first mobile network of more than one mobile network of a communication network, an approaching coverage limit for a coverage area associated with a link between the first mobile network and a user equipment, wherein the user equipment comprises a multi subscriber identity module and wherein a first subscriber identity module of the multi subscriber module is connected to a network node associated with the first mobile network; and based on determining, send towards the user equipment information comprising an indication to perform pro-active preparation for causing a second subscriber identity module of the multi subscriber identity module of the user equipment to enable preparation of switching by the second subscriber identity module to a second mobile network of the more than one mobile network in response to an upcoming failure of the link between the user equipment and the first mobile network based on the approaching coverage limit of the coverage area.

In another example aspect of the invention, there is a method comprising: determining, by a network node of a first mobile network of more than one mobile network of a communication network, an approaching coverage limit for a coverage area associated with a link between the first mobile network and a user equipment, wherein the user equipment comprises a multi subscriber identity module and wherein a first subscriber identity module of the multi subscriber module is connected to a network node associated with the first mobile network; and based on determining, sending towards the user equipment information comprising an indication to perform pro-active preparation for causing a second subscriber identity module of the multi subscriber identity module of the user equipment to enable pro-active preparation of switching by the second subscriber identity module to a second mobile network of the more than one public land mobile network in response to an upcoming failure of the link between the user equipment and the first public land mobile network based on the approaching coverage limit of the coverage area.

A further example embodiment is an apparatus and a method comprising the apparatus and method of the previous paragraphs, wherein at least one of the first mobile network or the second mobile network comprises a public land mobile network, wherein the determining is based on determining by the network node that the user equipment is moving out of the coverage area associated with a link between the first mobile network and a user equipment, wherein the pro-active preparation comprises performing early measurements based on information comprising radio channel conditions associated with at least one of the first mobile network or another mobile network of the communication network, wherein the information is based on information associated with outage knowledge of a database of cells collected by the network node, wherein the first subscriber identity module is registered in the first mobile network of the communication network and the second subscriber identity module is one of camped on a mobile network or is in a roaming mode, wherein the pro-active preparation comprises identifying with the first subscriber identity module that switching to another mobile network associated with the first subscriber identity module is not preferred based on radio conditions, wherein there is based on the identifying, causing the second subscriber identity module of the multi subscriber identity module to identify whether a different mobile network of the communication network associated with the second subscriber identity module is suitable to switch to in response to the determining for service continuity of at least one application at the user equipment, wherein the indication to perform pro-active preparation is based on radio conditions of the first mobile network of the more than one mobile network that the first subscriber identity module is connected to approaching a coverage limit of the coverage area, wherein the user equipment is connected to the first mobile network, wherein the second subscriber identity module of the user equipment is caused to prepare switching to another mobile network of the more than one mobile network the user equipment is also subscribed to, wherein the information comprises an indication of at least one condition to be met before establishing a further connection to another mobile network of the more than one mobile network, wherein the at least one condition is based on at least one of an expiration of a timer, an exact or abstract location of the user equipment, or radio resource management measurements, wherein the information comprises assistance information on suitable cells for switching to another mobile network and wherein the assistance information comprises an identification of another mobile network of the more than one mobile network, wherein the assistance information is directing the user equipment use one of the suitable cells to switch to the another mobile network of the more than one mobile network based on inter-operator agreements of the communication network, wherein the indication to perform pro-active preparation is based on at least one of abstract location knowledge or exact location knowledge by the network node, and wherein there is receiving from the user equipment a user equipment request message and report associated with a switch by the second subscriber identity module to another mobile network based on the pro-active preparation.

A non-transitory computer-readable medium storing program code, the program code executed by at least one processor to perform at least the method as described in the paragraphs above.

In another example aspect of the invention, there is an apparatus comprising: means for determining, by a network node of a first mobile network of more than one mobile network of a communication network, an approaching coverage limit for a coverage area associated with a link between the first mobile network and a user equipment, wherein the user equipment comprises a multi subscriber identity module and wherein a first subscriber identity module of the multi subscriber module is connected to the first mobile network; and means, based on determining, for sending towards the user equipment information comprising an indication to perform pro-active preparation for causing a second subscriber identity module of the multi subscriber identity module of the user equipment to enable preparation of switching by the second subscriber identity module to another mobile network of the more than one mobile network in response to an upcoming failure of the link between the user equipment and the first mobile network based on the approaching coverage limit of the coverage area.

In accordance with the example embodiments as described in the paragraph above, at least the means for determining and sending comprises a network interface, and computer program code stored on a computer-readable medium and executed by at least one processor.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 5 shows a table of an example of RRC Release Request with Report message in accordance with example embodiments of the invention;

DETAILED DESCRIPTION

In example embodiments of this invention there is proposed at least a method and apparatus to perform enhanced Service Continuity operations of a network device utilizing a Multi Universal Subscriber Identity Module.

Example embodiments of this invention can be seen to be in a context of support for multi-USIM devices mainly in 5G NR and LTE.

In many cases, inter-operator handover is not supported, hence, resulting in service interruptions which deteriorates the quality of experience of the user. In the cases where the UEs are vehicular UEs, this may cause significant safety problems (e.g., the user/vehicle is not aware of a hazardous situation).

It is noted that with Multi-SIM technology, Dual SIM UEs can facilitate the reduction of service interruption time in the above cases without requiring the deployment of inter-operator handover. However, MUSIM devices are mainly used to provide two independent subscriptions for the user and operate as two independent UE's corresponding to each USIM toward same or different PLMN (depending on the USIM's MNO). Hence, challenges with service interruptions are the same for each of the UE's subscriptions independent of existence of other USIMs with potentially different/better NW coverage in the same device. Therefore, service interruption delay still poses a significant challenge in serving low latency services.

Whereas, in accordance with example embodiments of this invention is a solution including to enable the serving network, once a network outage is foreseen by the network, to direct the Dual USIM UE to switch to another network (that of the second USIM card) if it is available, in order to reduce such service interruption delay time. This type of outage knowledge can come from previous history that may be stored in a database in the network and may be used to trigger the pro-active preparation.

Example embodiments of the invention can be using DSDA devices with DualRx/DualTx capability. It is noted that in this application the term UE will refer to UE configured with DSDA devices having DualRx/DualTx capabilities.

Figure 2:
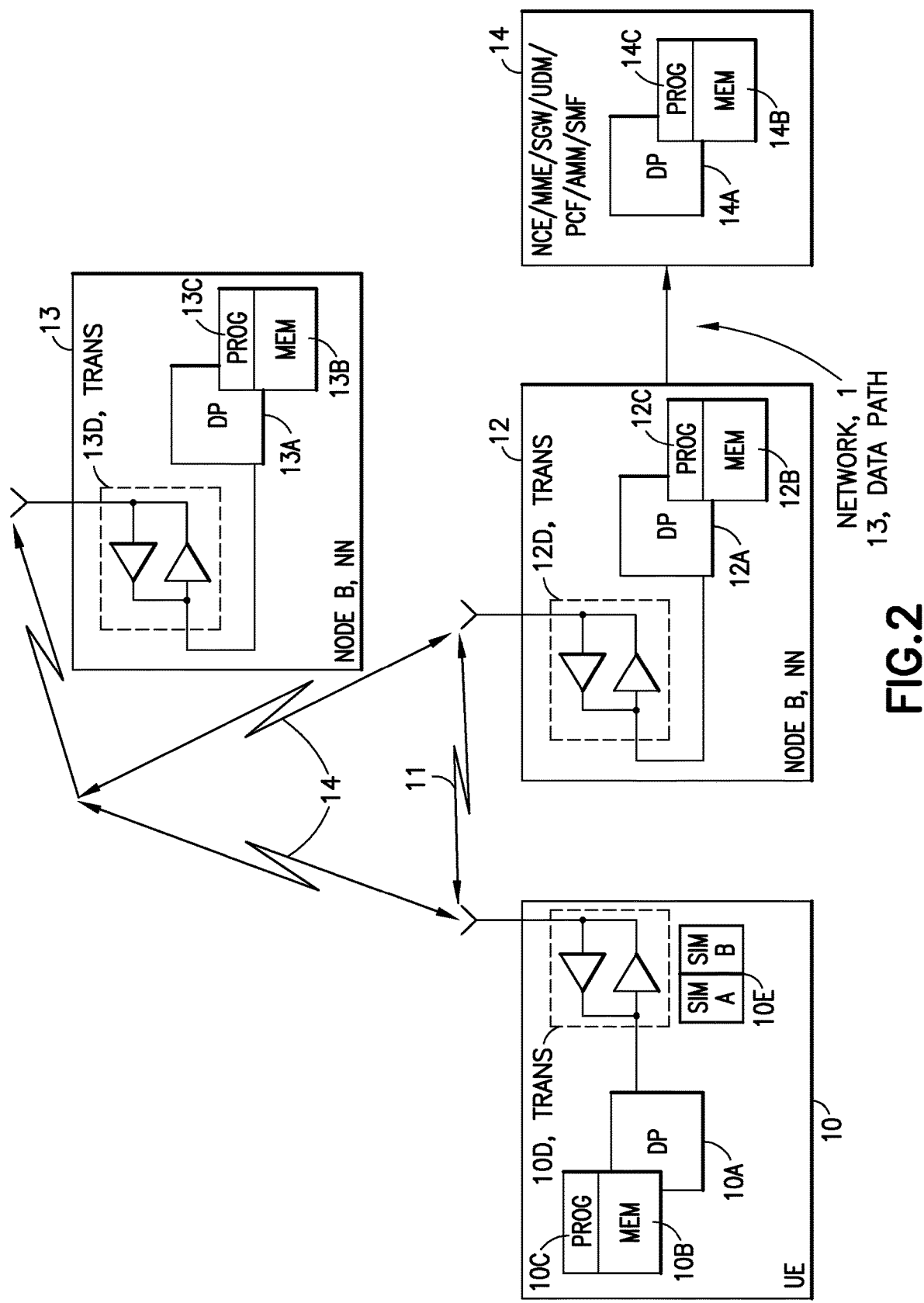
FIG. 2 shows a high level block diagram of various devices used in carrying out various aspects of the invention.

Before describing the example embodiments of the invention in detail, reference is made to FIG. 2 for illustrating a simplified block diagram of various electronic devices that are suitable for use in practicing the example embodiments of this invention.

FIG. 2 shows a block diagram of one possible and non-limiting exemplary system in which the example embodiments of the invention may be practiced. In FIG. 2, a user equipment (UE) 10 is in wireless communication with a wireless network 1 or network, 1 as in FIG. 2. The wireless network 1 or network 1 as in FIG. 2 can comprise a communication network such as a mobile network e.g., the mobile network 1 or first mobile network as disclosed herein. Any reference herein to a wireless network 1 as in FIG. 2 can be seen as a reference to any wireless network as disclosed herein. Further, the wireless network 1 as in FIG. 2 can also comprises hardwired features as may be required by a communication network. A UE is a wireless, typically mobile device that can access a wireless network. The UE, for example, may be a mobile phone (or called a "cellular" phone) and/or a computer with a mobile terminal function. For example, the UE or mobile terminal may also be a portable, pocket, handheld, computer-embedded or vehicle-mounted mobile device and performs a language signaling and/or data exchange with the RAN.

The UE 10 includes one or more processors DP 10A, one or more memories MEM 10B, and one or more transceivers TRANS 10D interconnected through one or more buses. Each of the one or more transceivers TRANS 10D includes a receiver and a transmitter. Further, each of the transceivers 10D is associated with a Subscriber identity module 10E. The subscriber identity module 10D can be associated with two or more identity subscriber modules, SIM 10E, each SIM as shown in FIG. 2 configured to perform example embodiments of the invention as disclosed herein. The one or more buses may be address, data, or control buses, and may include any interconnection mechanism, such as a series of lines on a motherboard or integrated circuit, fiber optics or other optical communication equipment, and the like. The one or more transceivers TRANS 10D which can be optionally connected to one or more antennas for communication 11 and 18 to NN 12 and NN 13, respectively. The one or more memories MEM 10B include computer program code PROG 10C. The UE 10 communicates with NN 12 and/or NN 13 via a wireless link 11.

The NN 12 (NR/5G Node B, an evolved NB, or LTE device) is a network node such as a master or secondary node base station (e.g., for NR or LTE long term evolution) that communicates with devices such as NN 13 and UE 10 of FIG. 2. The NN 12 provides access to wireless devices such as the UE 10 to the wireless network 1. The NN 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D can be optionally connected to one or more antennas for communication over at least link 11 with the UE 10. The one or more memories MEM 12B and the computer program code PROG 12C are configured to cause, with the one or more processors DP 12A, the NN 12 to perform one or more of the operations as described herein. The NN 12 may communicate with another gNB or eNB, or a device such as the NN 13 such as via link 14. Further, the link 11, link 14 and/or any other link may be wired or wireless or both and may implement, e.g., an X2 or Xn interface. Further the link 11 and/or link 14 may be through other network devices such as, but not limited to an NCE/SGW/AMF/UPF device such as the NCE/MME/SGW/UDM/PCF/AMM/SMF 14 of FIG. 2. The NN 12 may perform functionalities of an MME (Mobility Management Entity) or SGW (Serving Gateway), such as a User Plane Functionality, and/or an Access Management functionality for LTE and similar functionality for 5G.

The NN 13 can be associated with a mobility function device such as an AMF or SMF, further the NN 13 may comprise a NR/5G Node B or possibly an evolved NB a base station such as a master or secondary node base station (e.g., for NR or LTE long term evolution) that communicates with devices such as the NN 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter that can optionally be connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the NN 12 and the UE 10 or any other device using, e.g., link 11 or another link. The Link 14 as shown in FIG. 2 can be used for communication between the NN 12 and the NN 13. These links maybe wired or wireless or both and may implement, e.g., an X2 or Xn interface. Further, as stated above the link 11 and/or link 14 may be through other network devices such as, but not limited to an NCE/MMF/SGW device such as the NCE/MME/SGW/UDM/PCF/AMM/SMF 14 of FIG. 2.

The one or more buses of the device of FIG. 2 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the NN 12 being physically in a different location from the RRH, and the one or more buses 157 could be implemented in part as fiber optic cable to connect the other elements of the NN 12 to a RRH.

It is noted that although FIG. 2 shows a network nodes Such as NN 12 and NN 13. Any of these nodes may can incorporate or be incorporated into an eNodeB or eNB or gNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 or any network it can represent may or may not include a NCE/MME/SGW/UDM/PCF/AMM/SMF 14 that may include (NCE) network control element functionality, MME (Mobility Management Entity)/SGW (Serving Gateway) functionality, and/or serving gateway (SGW), and/or MME (Mobility Management Entity) and/or SGW (Serving Gateway) functionality, and/or user data management functionality (UDM), and/or PCF (Policy Control) functionality, and/or Access and Mobility Management (AMM) functionality, and/or Session Management (SMF) functionality, and/or Authentication Server (AUSF) functionality and which provides connectivity with a further network, such as a telephone network and/or a data communications network (e.g., the Internet), and which is configured to perform any 5G and/or NR operations in addition to or instead of other standards operations at the time of this application. The NCE/MME/SGW/UDM/PCF/AMM/SMF 14 is configurable to perform operations in accordance with example embodiments of the invention in any of an LTE, NR, 5G and/or any standards based communication technologies being performed or discussed at the time of this application. In addition, it is noted that the operations in accordance with example embodiments of the invention, as performed by the NN 12 and/or NN 13, may also be performed at the NCE/MME/SGW/UDM/PCF/AMM/SMF 14.

The NCE/MME/SGW/UDM/PCF/AMM/SMF 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM 14B and the computer program code PROG 14C are configured to, with the one or more processors DP 14A, cause the NCE/MME/SGW/UDM/PCF/AMM/SMF 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, NN 12, NN 13, and other functions as described herein.

It is noted that any reference to a network in this paper can refer to all cells that may or may not be nearby and may belong to any PLMN as discussed herein. For example a network can comprise any PLMN such as a home PLMN for first subscription where a network device such as a UE may be part of. Further, the network deice may be a visitor using this PLMN as VPLMN.

As similarly indicated above one solution in accordance with example embodiments of the invention is to enable the serving network, once a network outage is foreseen by the network, to direct the Dual USIM UE to switch to another network (that of the second USIM card) if it is available, in order to reduce the service interruption time.

Further, as similarly indicated above Example embodiments of the invention can be using DSDA devices with DualRx/DualTx capability. It is noted that in this application the term UE will refer to UE configured with DSDA devices having DualRx/DualTx capabilities.

In accordance with example embodiments of the invention once the UE is activated, it will register to the networks corresponding to each of its USIM cards. In case the UE is roaming, then it will attempt to register to the networks that the Home PLMN has configured in the USIM card. If none of these networks are available, then it will attempt to register to other available networks. In this solution we assume that:
USIM 1 will operate the local (home) network; the USIM 1 will register to the HPLMN (PLMN1) and the UE will access the service from this network; and/or
USIM 2 will be in roaming mode; and/or
A USIM 2 can be in HPLMN if coverage of two PLMN are overlapping.

Figure 1:
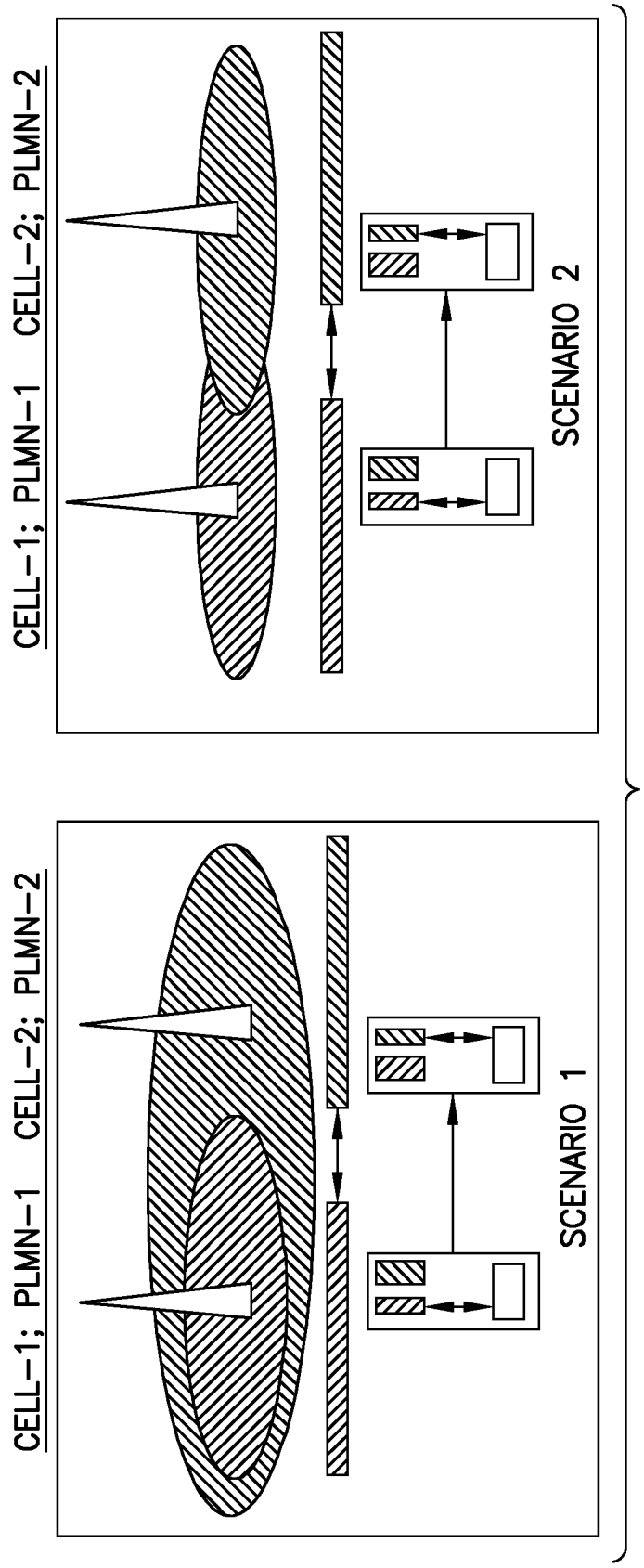
FIG. 1 shows a Schematic representation of DSDA UE switching operators with a scenario with partial overlapping coverage in Scenario 1 and a scenario with overlapped coverage of two different PLMNs in scenario 2.

According to the idea of this example embodiment of the invention, once the UE reaches the coverage limits of PLMN1, the network will indicate to the UE configured for MUSIM operation that it is reaching the network coverage limits and recommends it to switch to another network (FIG. 1). The indication may also include additional assistance information on suitable cells for switching to other PLMN. Then USIM 1 will inform USIM 2 about this trigger; since the network coverage limit is being approached, the latter will attempt to register to its HPLMN (PLMN2) if it is available or if not done already such as for a case of overlapping coverage. If this procedure is finalized, then USIM 2 will inform USIM 1 that it is successfully registered to another network and once the radio conditions are suitable it will switch to PLMN 2. Before performing this process, it will inform PLMN 1 that it is leaving and potentially adds its most recent measurements (if newer than the A2 event reporting) for NW's record and optimization.

In accordance with an example embodiment of the invention a USIM, (e.g., USIM1) of a device which the application is using in the beginning can be in a cell belonging to its HPLMN and another USIM, e.g., USIM2, to which the application of the device is switching to, may be camped to the same cell as a visitor and using this PLMN as a VPLMN. Thus, in accordance with example embodiments the switch may be a switch from a USIM1 to USIM2, or from a USIM2 to a USIM1.

Procedures as described above can be suitable for UEs that are crossing the border of a region/country. However, similar principles could be followed in case the UE moves within one country which has two PLMNs with partially overlapping coverages.

FIG. 1 shows a Schematic representation of DSDA UE switching operators with a scenario with partial overlapping coverage and a scenario with overlapped coverage of two different PLMNs.

As shown in FIG. 1 there are two scenarios with a DSDA capable MUSIM device with two subscriptions at different PLMNs. In each of these scenarios of FIG. 1 the devices are configured with MUSIM. In each of these scenarios a USIM1 of MUSIM configured device is RRC connected with PLMN1 with an ongoing application and another USIM such as a USIM2 of the MUSIM configured device is in RRC idle/inactive with PLMN2. In each of these scenarios the application in accordance with example embodiments of the invention supports switching of traffic. Two different scenarios are shown in FIG. 1:

Scenario 1: shows overlapped coverage of two different PLMNs. Example: macro and small cell coverage provided by different PLMNs or indoor/outdoor, or coverage holes in rural areas. In this case, the UE may be registered in both PLMNs and switch from PLMN1 to PLMN2 when it gets close to the cell border; and Scenario 2: shows non overlapped coverage. Example, cross-borders between two countries.

Further with regards to FIG. 1 the application setup in accordance with example embodiments of the invention can include:

For scenario 1: Overlapped coverage:
After registration completion independently with each PLMN, UE gets IP addresses IP1, IP2 from PLMN-1 and PLMN-2, respectively;
Application may be configured to route its traffic via IP-1/PLMN-1;
Application triggers setup of radio link and packet transmission via IP-2 in case of issues reported on IP-1; and For scenario 2: Non-overlapped coverage:
Registration in both PLMNs cannot be completed in advance. Only when the radio link of USIM-1 with PLMN-1 starts to be weak, the UE will be able to detect and register in PLMN-2,
As our focus is DSDA devices, the UE may measure and register in PLMN-2 with no damage to the USIM-1/PLMN-1.

Example embodiments of this invention include a SEP related to a SIP entitled "UE IMPLEMENTATION FOR ENHANCED SERVICE CONTINUITY UTILIZING MUSIM". The two inventions tackle the same problem that of enhanced service continuity, using MUSIM. The SEP is based on network directions, i.e. it requires standard change, whereas the SIP is based on autonomous UE implementation based on existing 3GPP standard specification.

Herein there is provided a detailed description of example embodiments of the invention as discussed herein.

With regards to service continuity, example embodiments of the invention can provide and monitor service continuity and service continuity failures. This service continuity can include continuity for all elements of data file(s) and/or voice file(s) of any communication session such as a multimedia session or any service type communication in any local area or wide area network, such as a 3GPP network. Further, it is noted that example embodiments of the invention can be used and are capable for determining a service continuity failure of at least one application at a network device, such as a user equipment.

As previously mentioned, the procedure of initiating the connection to a second network (with the second USIM) if a network outage is experienced in the first network, is very time consuming and has several delay components associated.

If the (Dual SIM) UE is informed about the forecasted outage it may omit certain delay components such as the RLF detection and corresponding re-establishment procedure, the UE camping procedure, Radio link setup and the PDP Context resumption which may be performed in advance to reduce the service interruption time.

In case the NW can predict the UE is about to move out of coverage in due time the network will impose or recommend change to the second USIM's network operator. This can be based on knowledge of outages, due to lack of gNB (e.g., gNB malfunction, network management information, country change, etc.).

The recommendation to the UE to switch to the other operator can be based on:
  Abstract location knowledge (e.g., cell level);
  Exact location knowledge; and/or
  RRM and RLM measurements In accordance with example embodiments of the invention any predicting operation as disclosed herein can at least be performed by monitoring radio signal quality changes or radio coverage changes over a predetermined period of time and using at least one threshold to determine a radio signal quality or radio coverage trend over a particular link and/or from a particular cell of PLMN. This determined trend can be used for any prediction as disclosed herein.

In accordance with example embodiments of the invention a reduction of radio components interruption is possible with proactive preparation for the application switching along with an inter-PLMN neighbor table/database.

In accordance with example embodiments of the invention the database may have information related to a current serving cell and neighboring cells to measure. In this case, a UE is able to measure at any cells configured by the NW. The database at NW can contain information of cells, such as nearby cells, and used to estimate whether the UE is approaching cell edge of a cell such as its current serving cell. The database can be used to proactively trigger UE to prepare connection to a better cell with another USIM of the UE.

In accordance with example embodiments of the invention a network device, such as a UE, is not only approaching the cell edge but a whole PLMN coverage area itself. In an example, a PLMN related to first USIM may have not have its own neighboring cells to use in a normal/legacy HO manner and triggers the UE to prepare moving the service to another PLMN using its other USIM.

In accordance with an example embodiment of the invention there is proposed that a proactive preparation to take place. Operations in accordance with example embodiments of the invention can include:
  UE-centric solution: In this case the UE identifies the potential coverage problem in PLMN in RRC-connected and proactively initiates RRC connection with PLMN of its second USIM and prepares IP switch; and/or
  Network-centric solution: In this case the network identifies the potential coverage problem and initiates preparation of IP switch to another PLMN.

Figure 3:
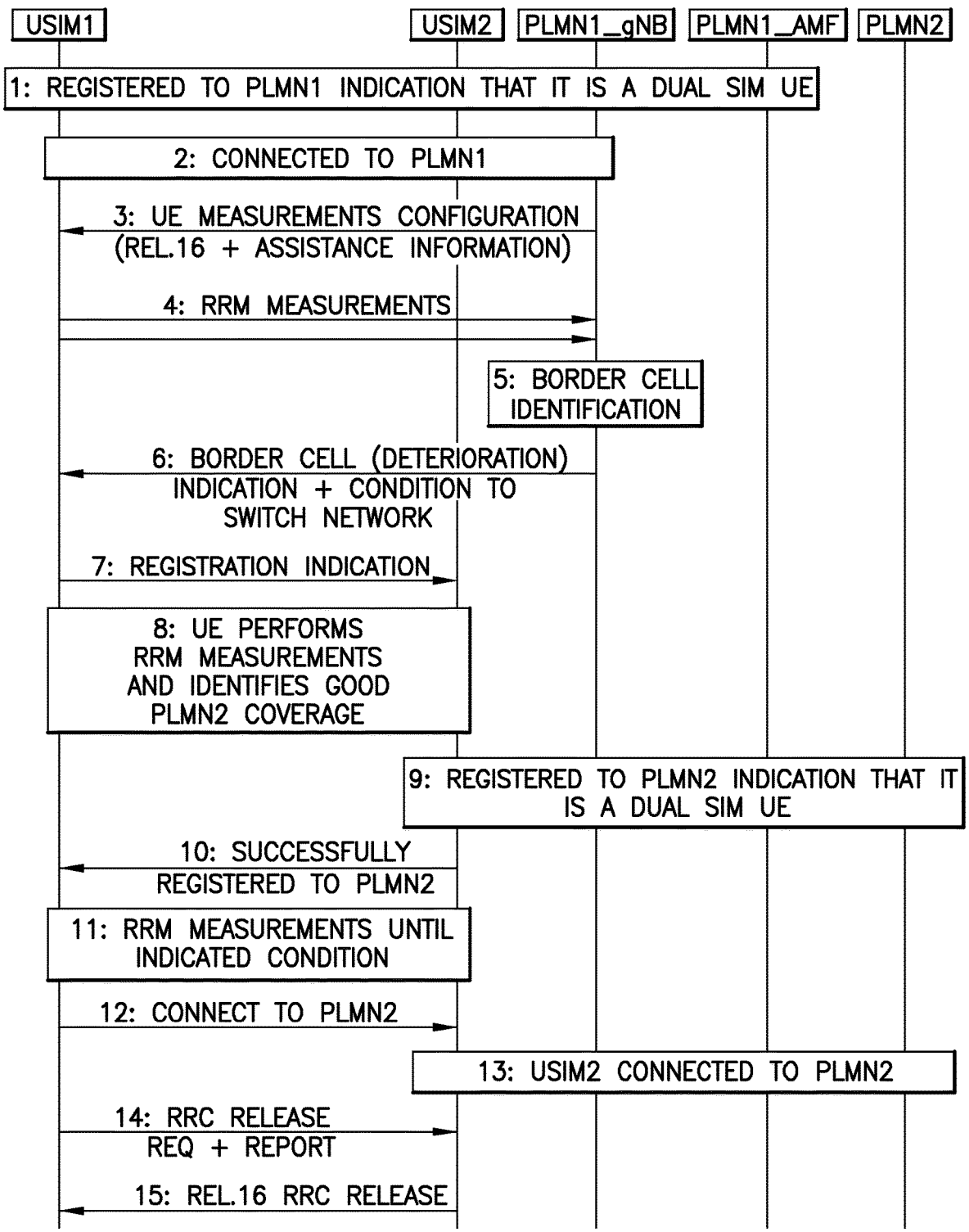
FIG. 3 shows a message exchange in accordance with example embodiments of the invention for directing a DSDA UE from PLMN1 to PLMN2 without agreements between the operators once network outage is forecasted.

The details of one proposal in accordance with example embodiments of the invention are captured in the Message Sequence Chart of FIG. 3. FIG. 3 shows a message exchange in accordance with example embodiments of the invention for directing a DSDA UE from PLMN1 to PLMN2 without agreements between the operators once network outage is forecasted.

Further, it is noted that the RRC connection can be proactively initiated to other cells which may be from another PLMN such as another home cell for a second subscription.

The procedure as shown in FIG. 3 includes the following steps:
1) The UE performs its registration to PLMN1 using USIM 1. The registration is based on 3GPP Rel. 16 procedures. In addition to the standard registration, it indicates that the UE is a MUSIM. This is stored in the UE context in the AMF (PLMN1_AMF) and the UE context in the gNB of the serving PLMN;
2) The UE is served by PLMN1 using USIM1;
3) The gNB of the serving PLMN (PLMN1_BS) configures the UE RRM measurements. They may include the storing of the following parameters' list:
  Radio Measurements (e.g., RSRP, RSRQ, CQI, SINR for the serving cell);
  UE location;
  measurements' frequency/periodicity; and
  Cause for serving PLMN/USIM change (e.g., upcoming or predicted radio link failure);
4) During its connection to the PLMN1 it will provide the measurements to its serving gNB following the RRM measurement configuration in step 3;
5) The gNB identifies that the UE is forecasted to exit the PLMN1 coverage. This may be identified using one or more of the following criteria:
  The UE is connected to a border gNB. This is known information at gNB applied to any UE who is using this gNB as serving cell;
  The exact location of the UE;
  RRM Measurements; and
  Combination of the above;
6) The gNB informs the UE about the fact that the UE is connected in a Border Cell and it simultaneously provides a condition to switch to the other network; the condition may be based on time (i.e., expiration of a timer), exact location and/or RRM measurements. The NW may use a new RRC message to send this information to the UE;
7) USIM1 indicates to USIM2 (UE internal) that it should register to the PLMN2 if it is not already registered. Note that USIM2 may be already registered to PLMN2 without requiring the indication from USIML. The indication from USIM1 to USIM2 is needed in cases with partial coverage of the two PLMNs (i.e., PLMN1 and PLMN2) or for energy saving purposes;
8) USIM1 and USIM2 perform RRM measurements according to their respective configuration;
9) Once PLMN2 has good coverage, USIM2 registers to PLMN2 (if not already registered) and indicates that the UE is a MUSIM UE as in step 1;

10) Once the registration is finalized the USIM2 informs USIM1;
11) USIM1 performs RRM Measurements until condition of step 6 is met;
12) Once condition is met USIM1 notifies USIM2 to connect;
13) USIM2 connects to PLMN2;
14) Once condition of step 6 is met, USIM1 requests to release the resources and turn to RRC_IDLE state. At the same time, it provides the measurements report following the RRM measurement configuration in step 3 containing:
   Radio Measurements (e.g., RSRP, RSRQ, CQI, SINR for the serving cell),
   location,
   cause for serving PLMN/USIM change (e.g., upcoming or predicted radio link failure); and
15) PLMN1_gNB transmits to the USIM1 a release request (as indicated in 3GPP rel.16 RRC or similar radio control protocols)

The report in step 14 of FIG. 3 is in the form of a table containing:
Radio Measurements (e.g., RSRP, RSRQ, CQI, SINR for the serving cell),
Location, and
Cause for serving PLMN/USIM change (e.g., upcoming or predicted radio link failure)

Figure 4:
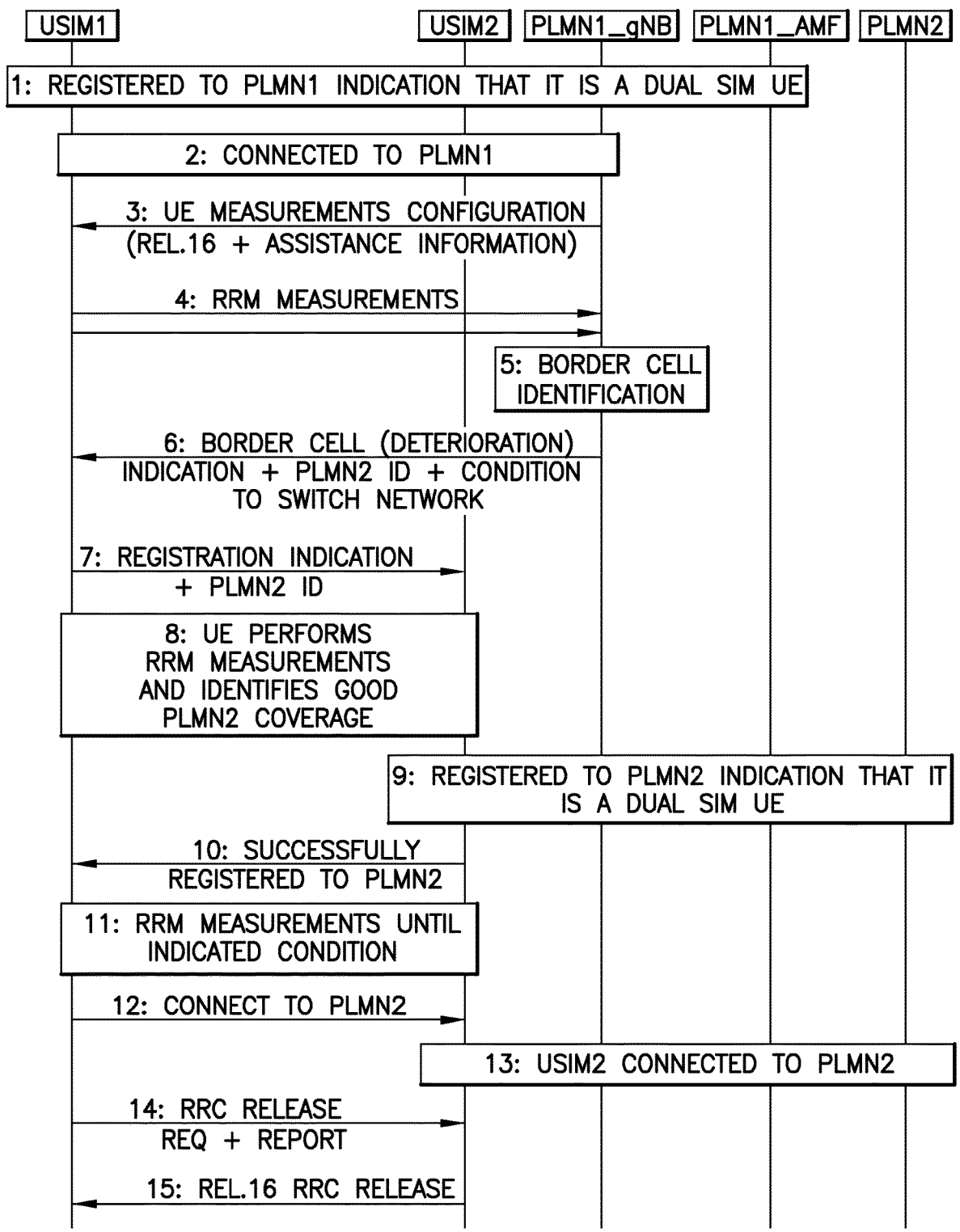
FIG. 4 shows a message Exchange in accordance with example embodiments of the invention for directing a DSDA UE from PLMN1 to PLMN2 with agreements between the operators once network outage is forecasted.

FIG. 4 provides an alternative implementation of a solution such as the proposed solution. This implementation enables the network to direct the UE to switch to PLMN2 based on agreements between the two operators. In this case steps 1-5, 8-15 of FIG. 4 remain unchanged from FIG. 3. The Key difference between FIG. 3 and FIG. 4 lies in steps 6 and 7 where the PLMN2 ID is provided by the PLMN1_gNB to USIM1 and by USIM1 to USIM2. Then, USIM2 will use this information to perform the measurements and the registration to PLMN2.

Further, in accordance with example embodiments of the invention if additional information is available at a PLMN1 for example based on the agreements between the two operators (such as cell ID of PLMN2, etc.) it will provided to the USIM1 and by USIM1 to USIM2

In other alternative implementations the UE in its initial registration, in order to inform the PLMN1 and PLMN2 about the presence of the multiple USIM cards, it may provide the SUPIs or the IMSIs that are linked to each USIM.

FIG. 5 shows a table of an example of RRC Release Request with Report message in accordance with example embodiments of the invention. Example of such message can be found in FIG. 5.

Figure 6A:
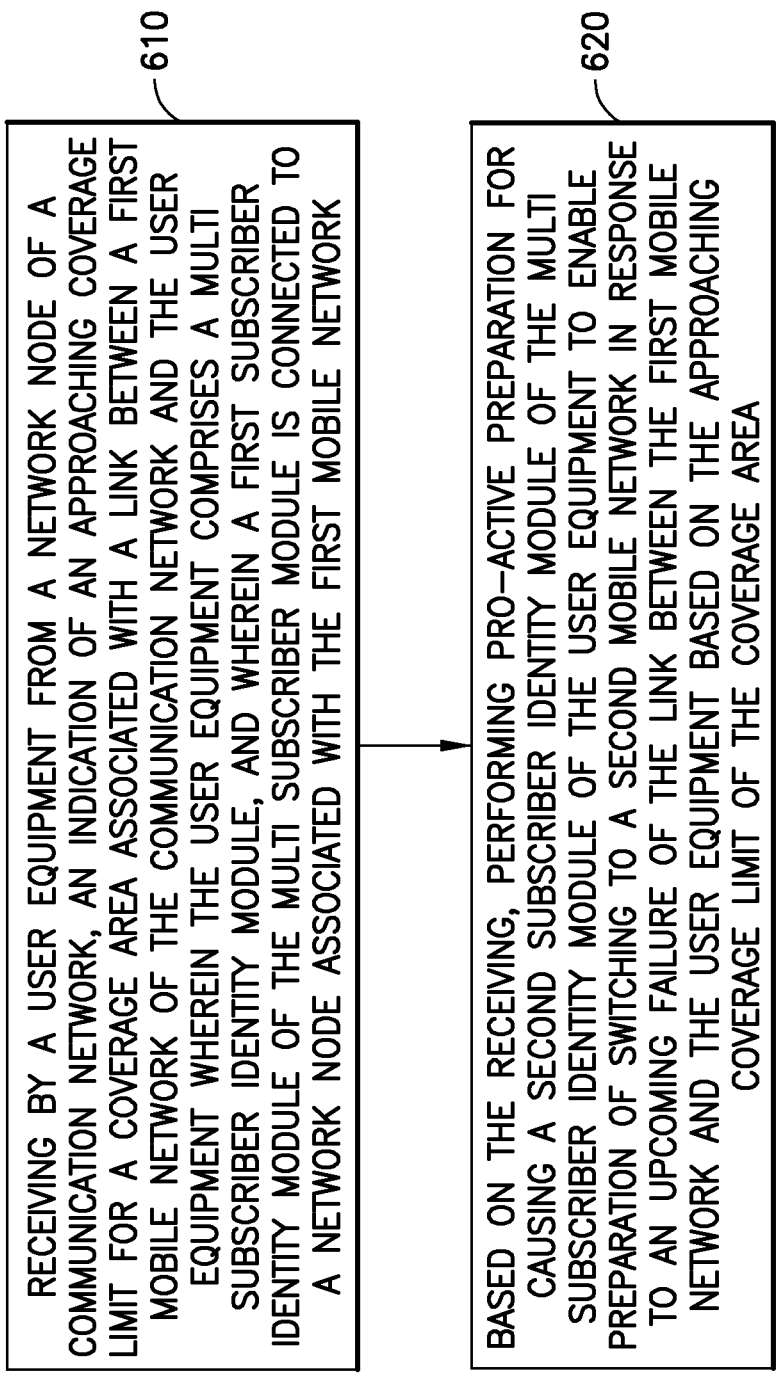
FIG. 6A and FIG. 6B each show a method in accordance with example embodiments of the invention which may be performed by an apparatus.

FIG. 6A illustrates operations which may be performed by a device such as, but not limited to, a user device (e.g., the UE 10 as in FIG. 2). As shown in step 610 of FIG. 6A there is receiving from a network node of a communication network, by a user equipment of a first mobile network of more than one mobile network of the communication network, an indication of an approaching coverage limit for a coverage area associated with a link between the first mobile network of the communication network and the user equipment wherein the user equipment comprises a multi subscriber identity module, and wherein a first subscriber identity module of the multi subscriber module is connected to a network node associated with the first mobile network. Then as shown in step 620 of FIG. 6A there is, based on the receiving, performing pro-active preparation for causing a second subscriber identity module of the multi subscriber identity module of the user equipment to enable pro-active preparation of switching to a second mobile network of the more than one mobile network in response to an upcoming failure of the link between the user equipment and the first mobile network based on the approaching coverage limit of the coverage area.

In accordance with the example embodiments as described in the paragraph above, wherein the preparation is based on an indication from the network node of the first mobile network that the user equipment is moving out of the coverage area.

In accordance with the example embodiments as described in the paragraphs above, wherein the pro-active preparation comprises performing early measurements based on information associated with radio conditions of the communication network.

In accordance with the example embodiments as described in the paragraphs above, wherein the information is associated with outage knowledge of a database of cells collected by the network node.

In accordance with the example embodiments as described in the paragraphs above, wherein the information comprises an indication of at least one condition to be met before establishing a further connection to another mobile network of the more than one mobile network.

In accordance with the example embodiments as described in the paragraphs above, wherein the at least one condition is based on at least one of an expiration of a timer, an exact location of the user equipment, or radio resource management measurements.

In accordance with the example embodiments as described in the paragraphs above, wherein the information comprises assistance information on a suitable more than one mobile network for the further connection, and wherein the assistance information comprises an identification of another mobile network of the more than one mobile network.

In accordance with the example embodiments as described in the paragraphs above, wherein the assistance information is directing the user equipment to switch to the another mobile network based on inter-operator agreements of the communication network.

In accordance with the example embodiments as described in the paragraphs above, wherein the performing pro-active preparation is based on radio conditions of the first mobile network of the more than one mobile network that the first subscriber identity module is connected to approaching a coverage limit of the coverage area.

In accordance with the example embodiments as described in the paragraphs above, wherein the user equipment is connected to the first mobile network, and wherein the second subscriber identity module of the user equipment is caused to perform pro-active preparation for switching to another mobile network of the more than one mobile network the user equipment is also subscribed to.

In accordance with the example embodiments as described in the paragraphs above, wherein the first subscriber identity module is registered in the first mobile network of the communication network and the second subscriber identity module is one of camped on a mobile network or is in a roaming mode.

In accordance with the example embodiments as described in the paragraphs above, wherein the pro-active preparation comprises identifying with the first subscriber identity module that switching to another mobile network associated with the first subscriber identity module is not preferred based on radio conditions.

In accordance with the example embodiments as described in the paragraphs above, wherein there is, based on the identifying, causing the second subscriber identity module of the multi subscriber identity module to identify whether a different mobile network of the more than one mobile network of the communication network associated with the second subscriber identity module is suitable to switch to in response to determining service continuity failure of at least one application at the user equipment.

In accordance with the example embodiments as described in the paragraphs above, wherein the determining is based on at least one of knowledge of outages, network node malfunction, network management information, or a country change.

In accordance with the example embodiments as described in the paragraphs above, wherein the indication to perform pro-active preparation is based on at least one of abstract location knowledge or exact location knowledge by the network node.

In accordance with the example embodiments as described in the paragraphs above, wherein the indication is based on at least one of radio resource management or radio link monitoring measurements.

In accordance with the example embodiments as described in the paragraphs above, wherein there is communicating by the user equipment a request message and report associated with a switch by the second subscriber identity module of the user equipment based on the pro-active preparation.

In accordance with an example embodiment of the invention as described above there is an apparatus comprising: means for receiving (TRANS 10D, MEM 10B, PROG 10C, and DP 10A as in FIG. 2) from a network node (NN 12 or NN 13 as in FIG. 2) of a first mobile network of more than one mobile network of a communication network (Network 1 as in FIG. 2), by a user equipment (UE 10 as in FIG. 2) of the first mobile network, an indication of an approaching coverage limit for a coverage area associated with a link between the first mobile network and the user equipment wherein the user equipment comprises a multi subscriber identity module, and wherein a first subscriber identity module of the multi subscriber module is connected to the first mobile network. Then as shown in step 620 of FIG. 6A there is, based on the receiving, performing (TRANS 10D, MEM 10B, PROG 10C, and DP 10A as in FIG. 2) pro-active preparation for causing a second subscriber identity module of the multi subscriber identity module of the user equipment to enable preparation of switching to another mobile network of the more than one mobile network in response to an upcoming failure of the link between the user equipment and the first mobile network based on the approaching coverage limit of the coverage area.

In the example aspects of the invention according to the paragraph above, wherein at least the means for receiving and performing comprises a non-transitory computer readable medium [MEM 10B as in FIG. 2] encoded with a computer program [PROG 10C as in FIG. 2] executable by at least one processor [DP 10A as in FIG. 2].

Figure 6B:
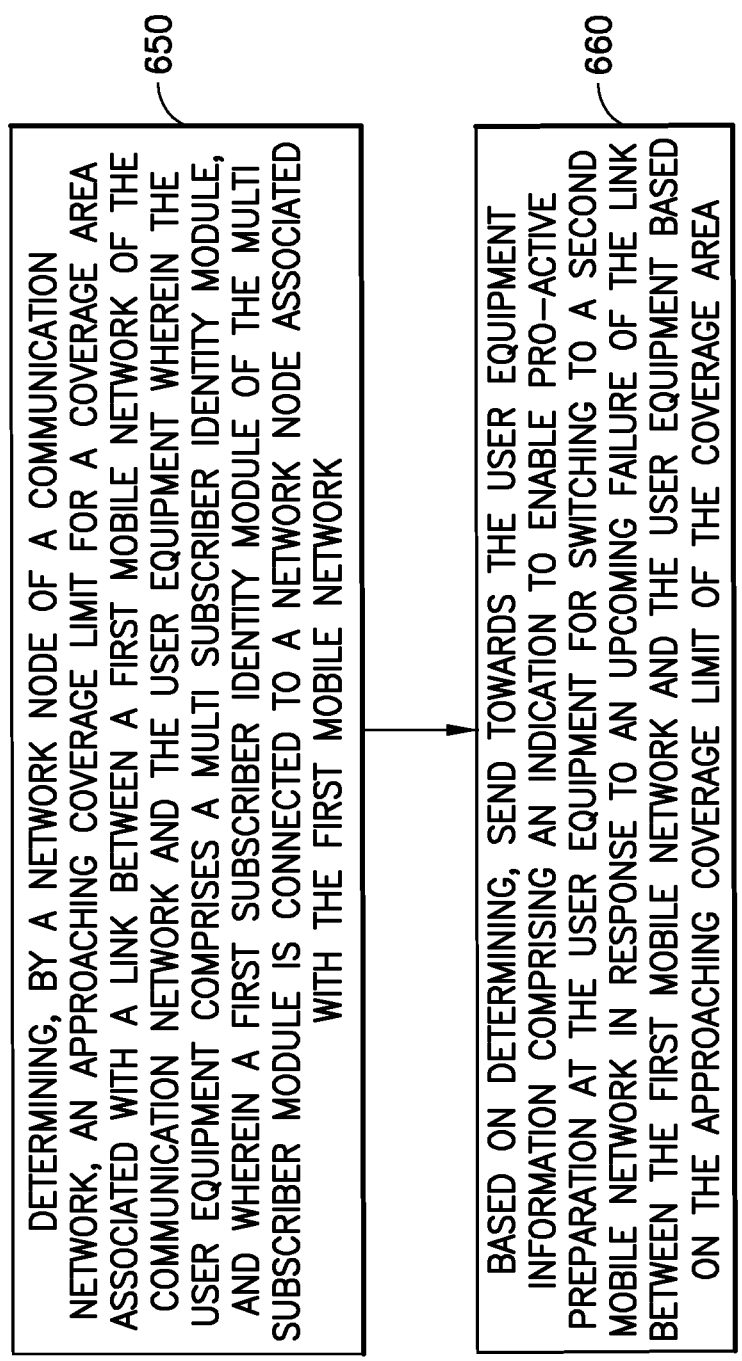

FIG. 6B illustrates operations which may be performed by a network device such as, but not limited to, a network node NN 12 and/or NN 13 as in FIG. 2 or an eNB. As shown in step 650 of FIG. 6B there is determining, by a network node of a first mobile network of more than one mobile network of a communication network, an approaching coverage limit for a coverage area associated with a link between the first mobile network and a user equipment, wherein the user equipment comprises a multi subscriber identity module and wherein a first subscriber identity module of the multi subscriber module is connected to the first mobile network. Then as shown in step 650 of FIG. 6B there is, based on determining, sending towards the user equipment information comprising an indication to perform pro-active preparation for causing a second subscriber identity module of the multi subscriber identity module of the user equipment to enable preparation of switching by the second subscriber identity module to a second mobile network of the more than one mobile network in response to an upcoming failure of the link between the user equipment and the first mobile network based on the approaching coverage limit of the coverage area.

In accordance with the example embodiments as described in the paragraph above, wherein the determining is based on determining by the network node that the user equipment is moving out of the coverage area associated with a link between the first mobile network and a user equipment.

In accordance with the example embodiments as described in the paragraphs above, wherein the pro-active preparation comprises performing early measurements based on information comprising radio channel conditions associated with at least one of the first mobile network or another mobile network of the communication network.

In accordance with the example embodiments as described in the paragraphs above, wherein the information is based on information associated with outage knowledge of a database of cells collected by the network node.

In accordance with the example embodiments as described in the paragraphs above, wherein the first subscriber identity module is registered in the first mobile network of the communication network and the second subscriber identity module is camped on a mobile network or is in a roaming mode.

In accordance with the example embodiments as described in the paragraphs above, wherein the pro-active preparation comprises identifying with the first subscriber identity module that switching to another mobile network associated with the first subscriber identity module is not preferred based on radio conditions.

In accordance with the example embodiments as described in the paragraphs above, wherein there is, based on the identifying, causing the second subscriber identity module of the multi subscriber identity module to identify whether a different mobile network of the communication network associated with the second subscriber identity module is suitable to switch to in response to the determining for service continuity of at least one application at the user equipment.

In accordance with the example embodiments as described in the paragraphs above, wherein the indication to perform pro-active preparation is based on radio conditions of the first mobile network of the more than one mobile network that the first subscriber identity module is connected to approaching a coverage limit of the coverage area.

In accordance with the example embodiments as described in the paragraphs above, wherein the user equipment is connected to the first mobile network, and wherein the second subscriber identity module of the user equipment is caused to prepare switching to another mobile network of the more than one mobile network the user equipment is also subscribed to.

In accordance with the example embodiments as described in the paragraphs above, wherein the information comprises an indication of at least one condition to be met before establishing a further connection to another mobile network of the more than one mobile network.

In accordance with the example embodiments as described in the paragraphs above, wherein the at least one condition is based on at least one of an expiration of a timer, an exact or abstract location of the user equipment, or radio resource management measurements.

In accordance with the example embodiments as described in the paragraphs above, wherein the information comprises assistance information on suitable cells for switching to another mobile network and wherein the assistance information comprises an identification of another mobile network of the more than one mobile network.

In accordance with the example embodiments as described in the paragraphs above, wherein the assistance information is directing the user equipment use one of the suitable cells to switch to the another mobile network of the more than one mobile network based on inter-operator agreements of the communication network.

In accordance with the example embodiments as described in the paragraphs above, wherein the indication to perform pro-active preparation is based on at least one of abstract location knowledge or exact location knowledge by the network node.

In accordance with the example embodiments as described in the paragraphs above, there is receiving from the user equipment a user equipment request message and report associated with a switch by the second subscriber identity module to another mobile network based on the pro-active preparation.

A non-transitory computer-readable medium (MEM 12B and/or MEM 13B as in FIG. 2) storing program code (PROG 12C and/or PROG 13C as in FIG. 2), the program code executed by at least one processor (DP 12A and/or DP 13A as in FIG. 2) to perform the operations as at least described in the paragraphs above.

In accordance with an example embodiment of the invention as described above there is an apparatus comprising: means for determining (TRANS 12D and/or TRANS 13D, DP 12A and/or DP 13A, PROG 12C and/or PROG 13C, and MEM 12B and/or MEM 13B as in FIG. 2), by a network node (NN 12 or NN 13 as in FIG. 2) of a first mobile network of more than one mobile network of a communication network (Network 1 as in FIG. 2), an approaching coverage limit for a coverage area associated with a link between the first mobile network and a user equipment (UE 10 as in FIG. 2), wherein the user equipment comprises a multi subscriber identity module and wherein a first subscriber identity module of the multi subscriber module is connected to a network node associated with the first public land mobile network; and means, based on determining, for sending (TRANS 12D and/or TRANS 13D, DP 12A and/or DP 13A, PROG 12C and/or PROG 13C, and MEM 12B and/or MEM 13B as in FIG. 2) towards the user equipment information comprising an indication to perform pro-active preparation for causing a second subscriber identity module of the multi subscriber identity module of the user equipment to enable preparation (TRANS 12D and/or TRANS 13D, DP 12A and/or DP 13A, PROG 12C and/or PROG 13C, and MEM 12B and/or MEM 13B as in FIG. 2) of switching by the second subscriber identity module to another mobile network of the more than one mobile network in response to an upcoming failure of the link between the user equipment and the first mobile network based on the approaching coverage limit of the coverage area.

In the example aspect of the invention according to the paragraph above, wherein at least the means for determining and sending comprises a non-transitory computer readable medium [MEM 12B and/or MEM 13B as in FIG. 2] encoded with a computer program [PROG 12C And/or PROG 13C as in FIG. 2] executable by at least one processor [DP 12A and/or DP 13B as in FIG. 2].

It is noted that example embodiments of the invention can require standardization in the RRC specifications, then the proof of usage is straightforward.

Additionally, NAS signalling updates are seen to be needed. Finally, interactions between the two USIM cards in the device are required. In particular based on example embodiments of the invention at least the following interactions can be standardized:

Indication to the network that the UE is Dual SIM;
UE measurements' configuration from the network for the DSDA UEs;
Border cell indication with switch indication;
RRC Release with the reports; and/or
Interactions between the two USIM cards (i.e., Registration indication, successfully registered, connect to PLMN2));
Interactions for creation of at least one database of supported cells and of previous failures in different PLMN of a network. The at least one database may have information related to a current serving cell and other neighboring cells of a particular PLMN to measure, and can contain information of such cells or there PLMN, such as information of cell edges for a particular PLMN and/or nearby cells or PLMN for use to estimate whether the UE is approaching a coverage limit or a particular PLMN cell.

It is noted that a cell can belong to a PLMN. In addition, a single PLMN or a network can know its own coverage, hence, its edge. When the UE reaches a cell edge belonging to this PLMN it also knows it is the (last) cell at its coverage, i.e. it has no other "own" cells to trigger HO.

Further, based on a generated database and/or agreements across PLMN owners (MNOs) the network may know the UE is moving to coverage of another PLMN. It cannot provide measurement information but will trigger the UE to camp on (if not already) and move to RRC_connected with that PLMN using information available to that PLMN to UEs other USIM.

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);
(b) combinations of hardware circuits and software, such as (as applicable):
   (i) a combination of analog and/or digital hardware circuit(s) with software/firmware; and
   (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and
(c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations as disclosed in this application, this 'circuitry' as may be used herein refers to at least the following:
(a) hardware-only circuit implementations (such as implementations in only analog and/or digital circuitry); and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
   at least one processor; and
   at least one memory including computer program code, where the at least one memory and the computer program code are configured, with the at least one processor, to cause the apparatus to at least:
   receive by a user equipment from a network node of a communication network, an indication of an approaching coverage limit for a coverage area associated with a link between a first mobile network of the communication network and the user equipment wherein the user equipment comprises a multi subscriber identity module, and wherein a first subscriber identity module of the multi subscriber module is connected to a network node associated with the first mobile network; and
   based on the receiving, perform pro-active preparation for causing a second subscriber identity module of the multi subscriber identity module of the user equipment to enable preparation of switching to a second mobile network in response to an upcoming failure of the link between the first mobile network and the user equipment based on the approaching coverage limit of the coverage area.

2. The apparatus of claim 1, wherein the preparation is based on an indication from the network node that the user equipment is moving out of the coverage area.

3. The apparatus of claim 1, wherein the at least one processor and the computer program codes configured to cause the apparatus to perform pro-active preparation comprises at least one processor and the computer program codes configured to cause the apparatus to perform early measurements based on information associated with radio conditions of the communication network.

4. The apparatus of claim 3, wherein the information is associated with outage knowledge of a database of cells collected by the network node.

5. The apparatus of claim 3, wherein the information comprises an indication of at least one condition to be met before establishing a further connection to another mobile network.

6. The apparatus of claim 5, wherein the at least one condition is based on at least one of an expiration of a timer, an exact location of the user equipment, or radio resource management measurements.

7. The apparatus of claim 3, wherein the information comprises assistance information on a suitable more than one mobile network for the further connection, and wherein the assistance information comprises an identification of another mobile network of the communication network.

8. The apparatus of claim 7, wherein the assistance information is directing the user equipment to switch to the another mobile network based on inter-operator agreements of the communication network.

9. The apparatus of claim 1, wherein the at least one processor and the computer program codes configured to cause the apparatus to perform pro-active preparation comprises the at least one processor and the computer program codes configured to cause the apparatus to perform pro-active preparation based on radio conditions of a cell of the first mobile network that the first subscriber identity module is connected to approaching a coverage limit of the coverage area.

10. The apparatus of claim 9, wherein the user equipment is connected to the first mobile network, and wherein the second subscriber identity module of the user equipment is caused to perform pro-active preparation for switching to another mobile network of more than one mobile network of the communication network that the user equipment is also subscribed to.

11. The apparatus of claim 1, wherein the first subscriber identity module is registered in the first mobile network of the communication network and the second subscriber identity module is one of camped on a mobile network or is in a roaming mode.

12. The apparatus of claim 1,
wherein the at least one processor and the computer program codes configured to cause the apparatus to perform pro-active preparation comprises the at least one processor and the computer program codes configured to cause the apparatus to identify with the first subscriber identity module that switching to network node of the mobile network associated with the first subscriber identity module is not preferred based on approaching the coverage limit of the first mobile network; and the at least one processor and the computer program codes are configured to further cause the apparatus to cause, based on the identifying, the second subscriber identity module of the multi subscriber identity module to identify whether a different mobile network of the more than one mobile network of the communication network associated with the second subscriber identity module is suitable to switch to in response to the indication of the approaching coverage limit.

13. The apparatus of claim 1, wherein at least one of the first mobile network or the second mobile network comprises a public land mobile network.

14. The apparatus of claim 1, wherein the indication to perform pro-active preparation is based on at least one of abstract location knowledge or exact location knowledge by the network node.

15. The apparatus of claim 1, wherein the indication is based on at least one of radio resource management or radio link monitoring measurements.

16. The apparatus of claim 1, wherein the at least one processor and the computer program codes are configured to cause the apparatus to:
communicate by the user equipment a request message and report associated with a switch by the second subscriber identity module of the user equipment based on the pro-active preparation.

17. An apparatus, comprising:
at least one processor; and
at least one memory including computer program code, where the at least one memory and the computer program code are configured, with the at least one processor, to cause the apparatus to at least:
determine, by a network node of a first mobile network of more than one mobile network of a communication network, an approaching coverage limit for a coverage area associated with a link between the first mobile network and a user equipment, wherein the user equipment comprises a multi subscriber identity module and wherein a first subscriber identity module of the multi subscriber module is connected to a network node associated with the first mobile network; and
based on determining, send towards the user equipment information comprising an indication to enable pro-active preparation at the user equipment for switching to a second mobile network in response to an upcoming failure of the link between the first mobile network and the user equipment based on the approaching coverage limit of the coverage area.

18. The apparatus of claim 17, wherein at least one of the first mobile network or the second mobile network comprises a public land mobile network.

19. The apparatus of claim 17, wherein the at least one processor and the computer program codes configured to cause the apparatus to perform pro-active preparation comprises the at least one processor and the computer program codes configured to cause the apparatus to perform early measurements based on information comprising radio channel conditions associated with at least one of the first mobile network or another mobile network of the communication network.

20. The apparatus of claim 17, wherein the indication to perform pro-active preparation is based on at least one of abstract location knowledge or exact location knowledge by the network node.

* * * * *